US007717104B2

(12) United States Patent
Looft

(10) Patent No.: US 7,717,104 B2
(45) Date of Patent: May 18, 2010

(54) HANDHELD DEVICE FOR FAST ELECTRICAL IGNITION OF A CHARCOAL GRILL

(75) Inventor: Richard Looft, Lidingo (SE)

(73) Assignee: Looft Industries AB, Lidingö (SE)

( * ) Notice: Subject to any disclaimer, the term of this patent is extended or adjusted under 35 U.S.C. 154(b) by 550 days.

(21) Appl. No.: 11/179,734

(22) Filed: Jul. 12, 2005

(65) Prior Publication Data

US 2007/0012306 A1 Jan. 18, 2007

(51) Int. Cl.
*A47J 37/00* (2006.01)

(52) U.S. Cl. .......................... 126/25 B; 126/6; 126/35; 126/42; 126/66; 126/67; 219/70; 219/200; 219/245; 219/261; 34/68; 34/95.1; 34/95.2; 34/246; 392/379; 392/383; 392/486

(58) Field of Classification Search .............. 126/25 B, 126/6, 35, 61, 42, 66, 67, 88, 89, 232, 236, 126/405, 413; 219/70, 200, 245, 261; 34/68, 34/95.1, 95.2, 247, 246, 553; 392/486, 379, 392/383, 384, 385, 386
See application file for complete search history.

(56) References Cited

U.S. PATENT DOCUMENTS 1,977,151 A * 10/1934 Schottky .................... 219/261
2,192,732 A * 3/1940 Johnson ...................... 219/261
3,009,803 A * 11/1961 Damon et al. ................ 149/41
3,109,083 A * 10/1963 Meltzer ...................... 219/228
3,316,385 A * 4/1967 Anton ........................ 219/236
3,375,319 A * 3/1968 Beck .......................... 373/127
5,134,684 A * 7/1992 Mishou et al. .............. 392/486
5,357,646 A * 10/1994 Kim ............................ 15/111
5,616,022 A * 4/1997 Moran, IV .................. 431/253
5,671,321 A * 9/1997 Bagnuolo ................... 392/385
6,053,161 A 4/2000 Klaus
6,216,306 B1 * 4/2001 Esterson et al. ............... 15/111
2002/0084066 A1 * 7/2002 Vetrano ...................... 165/156

FOREIGN PATENT DOCUMENTS

AU 9656150 A * 1/1997
GB 384387 12/1932
GB 862063 3/1961
GB 959765 6/1964

* cited by examiner

*Primary Examiner*—Steven B McAllister
*Assistant Examiner*—Avinash Savani
(74) *Attorney, Agent, or Firm*—Lynn E. Barber

(57) ABSTRACT

A device comprising an improved electrical hot-air gun for fast ignition of the charcoal-bed of a barbeque charcoal grill for home use having a very short distance between the front of the hot-air gun and the electrical heating wire of the heating assembly and a very high outlet temperature. The hot-air gun also has a scraper mounted on the igniter/heater front to be able to aid in cleaning the grating of a BBQ grill.

3 Claims, 3 Drawing Sheets

HANDHELD DEVICE FOR FAST ELECTRICAL IGNITION OF A CHARCOAL GRILL

BACKGROUND OF THE INVENTION

1. Field of the Invention

This invention relates to the use of an improved electrical hot-air gun for fast ignition of the charcoal-bed of a barbeque charcoal grill for home use.

2. Description of the Related Art

Hot-air guns, which produce a flow of hot air can effectively be used to perform various tasks including removal of paint, shrinking of tubes and wraps, soldering etc. They are available in models for the handy homeowner as well as semi- and full professional ones. What differentiates the simpler from the more expensive hot-air guns is the sturdiness and increased outlet temperature and volume of heated air in the more expensive versions. There are no handheld electrical ones available that are specifically designed to have a sufficient temperature outlet to effectively ignite a charcoal bed of an open BBQ grill.

One common way of igniting a charcoal grill is using lighter-fluid made out of a variety of petrochemical products. Among the many disadvantages associated with this method is that it is dangerous to handle petrochemical products close to an open fire. Another disadvantage is the large amount of hydrocarbons that the lighter fluid produces when burning. In Sweden alone the annual use of lighter-fluid is 2000 metric tons. Another disadvantage associated with this method is that the lighter-fluid occasionally gives the cooked food an off-flavor.

The problem with using a regular handheld hot-air gun to ignite fixed fuel such a charcoal on an open bed is that it has too low an outlet temperature given the loss of energy in an open bed such as in a open charcoal grill. This means that the ignition will at best take quite long time or will not work at all. Further, repeated such use of a regular hot-air gun will dramatically shorten its expected lifespan as it is not intended for long periods of use at the temperatures used during ignition.

There are, however, some other hot-air solutions than the present invention for igniting charcoal and other burnable materials on an open bed. One is described in U.S. Pat. No. 6,053,61 which is a specially-shaped dome to be fitted on a traditional hot-air gun to increase the effectiveness of the hot-air currents for accelerated ignition and burning of solid fuels, especially charcoal. Others such as the one described in WO9202765 A1 are driven by gas and require a propane tank or similar supply of fuel to operate and are therefore not as simple to use as the "LooftLighter" of the present invention, which requires only an electrical connection. Also, the lighter described in U.S. patent application Ser. No. 4,422,435 is gas driven.

Examples of previous electrical fire lighters for solid fuel such as charcoal include UK patent 959,765, UK patent 862,063 and UK patent 384,387. These lighters are all of larger construction making them less suitable for handheld ignition of a BBQ grill, but the largest difference compared to the present invention is their outlet temperature which is indicated in all three of these patents to be between 650-800° C.

Industrial hot-air blowers for various fixed installations, for example, in sealing bottles in a filling machine, such as LEISTER High Temperature Heater 10000 HT (from Leister Ltd, Sarnen, Switzerland) are available for outlet temperatures up to 900° C., however such heaters are not for handheld use. Regular multi-purpose hot-air guns normally give an outlet temperature of 300-600° C., such as model KX2000K by Black and Decker, (Towson, Md., U.S.A.). Some of the more professional handheld models typically have an outlet temperature going up to 600-650° C. (1100-1200° F.), for example Steinel HG3002LCD (Herzebrock-Clarholz, Germany). Due to its design with a high-effect heating element very close to the air-outlet, however, the handheld electrical igniter of the present invention is able to give a higher outlet temperature, making it significantly better in fast ignition of a charcoal-bed of an open BBQ grill.

It is therefore an object of the invention to provide a device comprising a handheld hot-air gun, which is constructed to deliver high outlet temperature, to be able to quickly ignite a charcoal bed or other solid fuel on an open grill or other surfaces. It is a further object of the invention to provide a design of such an igniter that will well withstand such high temperatures and also protect the user.

It is a further object of the invention to provide a scraper mounted on the igniter/heater front to be able to aid in cleaning the grating of an BBQ grill.

Other objects and advantages will be more fully apparent from the following disclosure and appended claims.

SUMMARY OF THE INVENTION

This invention relates to the use of an improved electrical hot-air gun for fast ignition of the charcoal-bed of a barbeque charcoal grill for home use. The invention also provides a scraper mounted on the igniter/heater front to be able to aid in cleaning the grating of an BBQ grill Other objects and features of the inventions will be more fully apparent from the following disclosure and appended claims.

DETAILED DESCRIPTION OF THE INVENTION AND PREFERRED EMBODIMENTS THEREOF

In the following detailed description of the preferred embodiments of the present invention, reference is made to the accompanying drawings which, in conjunction with this detailed description, illustrate and describe a specific preferred hot-air gun assembly. The invention may also be embodied in many different forms and should not be construed as limited to only the disclosed embodiments. The provided embodiments are included so the disclosure will be thorough, complete and will fully convey the scope of the invention to persons of ordinary skill in the art.

The hot-air gun of the present invention, named "LooftLighter", has an improved position of the heating element in combination with high effect of the same, in order to increase the immediate temperature at the air outlet from the hot-air gun, compared to existing models. The location of the heating element at the very front position of the hot-air gun, close to the end used for ignition which is close to the air outlet, makes it possible to transfer maximum amount of energy into igniting the solid fuel. If a longer distance is used, such as in a regular hot-air gun, the energy losses becomes too large for efficient ignition and even if ignition is at all possible, it will take too long a time to be practical. The higher temperature of the output air is needed for a fast ignition of the charcoal bed of an grill. The "LooftLighter" is also specifically designed to withstand such increased temperatures and has also a scraping feature for cleaning of the grill grating. The hot-air gun of the invention ignites the charcoal BBQ in a much faster, safer and more convenient way than any other product on the market. In addition, the invention herein also saves the environment compared to petroleum based igniters.

The charcoal grill has a fast ignition and can be lit in less than 90 seconds with the invention. It is fast, fun and simple. The invention just needs to be plugged in and placed at the surface of the charcoal, and the button pressed. In 15 seconds, the coal starts to glow, and in 30 seconds the coal is burning. Depending on the size of the grill it takes about 90 seconds to have it fully ignited, and this performance is define herein as "fast ignition". The output air directly in front of the "LooftLighter" should be between 700-1100° C., and preferably not lower than 850-950° C.

The preferred embodiment of the product of the invention also has another component: after re-using the grill there are many times parts of old food sticking to the grating which is hard to get rid of. By using the scraping assembly on the "LooftLighter" and with the combination of high heat and scraping, the old food is burnt away in a quick and hygienic way.

Figure 3:
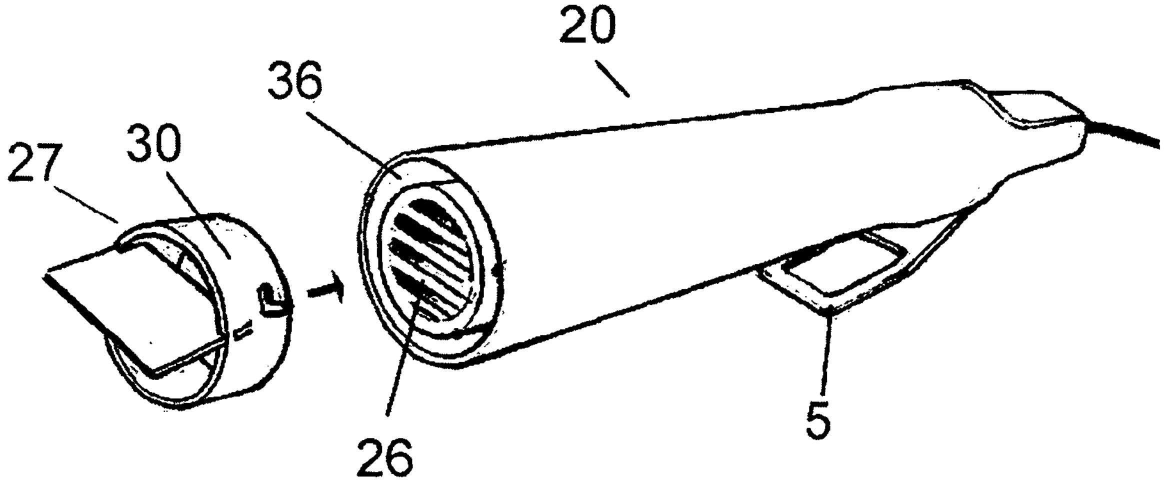
FIG. 3 is a perspective view of the grid scraper assembly of the invention mounted thereon.

Another preferred feature of the invention is that it preferably has a ceramic heating element, which is resistance wire covered in ceramics for better heat characteristics. The ceramic heating element self-regulates the heat output in case the air inlet is blocked. In the preferred embodiment, cool touch covers, handle and perforated outer tubing outside the heating element provide additional safety. Thus, in the preferred embodiment of the invention, the heating elements themselves are fully encapsulated in ceramic and are unsurpassed in terms of even heating, durability and longevity. Another preferred feature of the invention is that it preferably has a stand to place the still warm hot-air gun on without possibly damaging the surface underneath, such a stand may be combined with a bottle-opener as illustrated in FIG. 3.

The invention herein also contains highly efficient DC brushless motors, such as a typical standard motor for such applications, which adds to the product high level of performance and reliability. Electronically monitored temperature and air flow as is known in the art are also preferred features of the invention herein. The hot-air gun is preferably turned on and off using a power-button connected to a power-switch or with a similar means.

Figure 1:
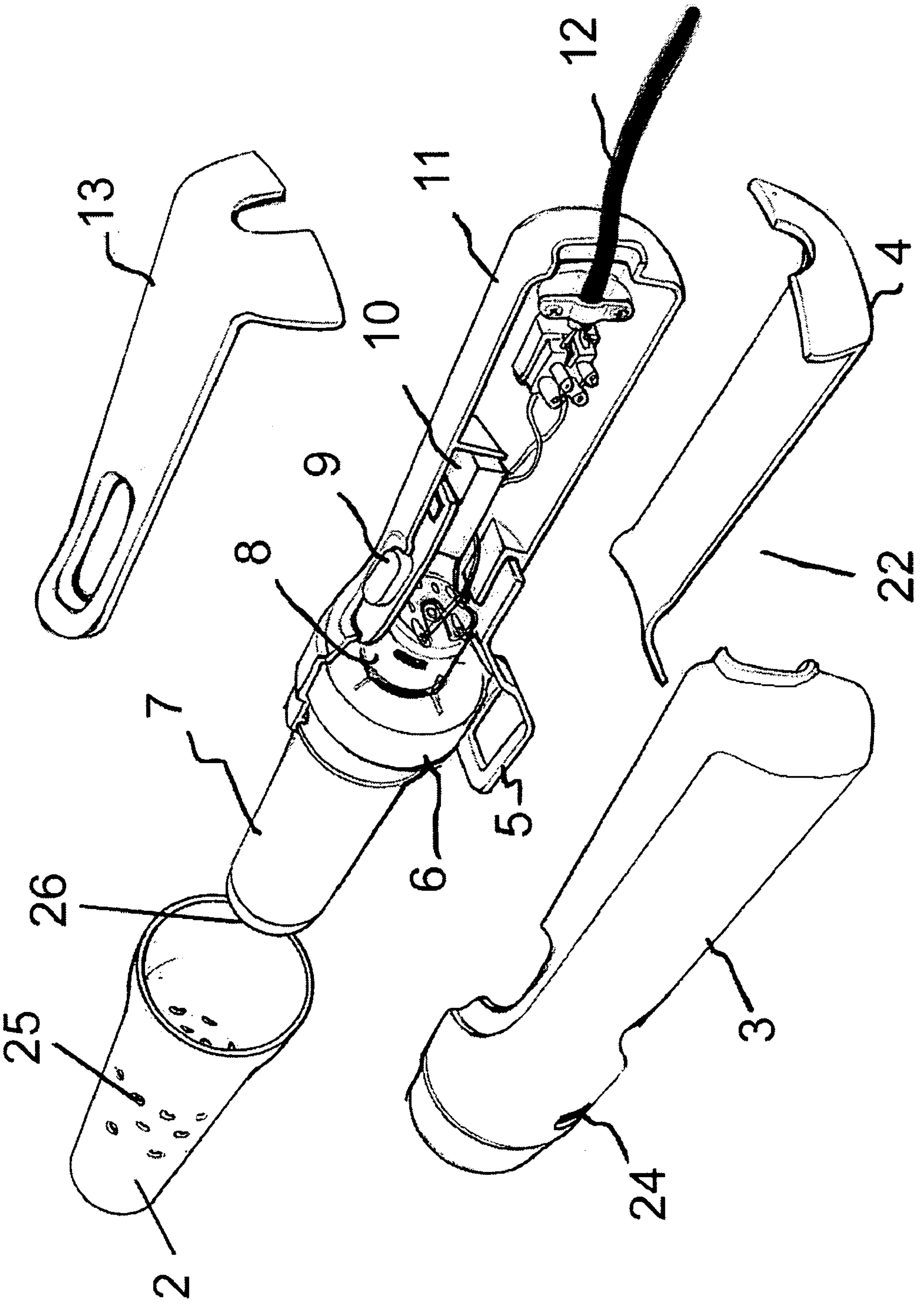
FIG. 1 is a top perspective exploded view of the complete assembly of the invention.

Turning now to the drawings, FIG. 1 shows a typical design of the hot-air gun 20 of the present invention may be comprised of a handle 22 formed by the covers 3, 4, 11 and 13, although other configurations are within the scope of this invention. The outer shell portion comprising these covers of the hot-air gun 20 may be fabricated of a substantially non heat-conducting, and/or electrically insulated material such as plastic. An alternative one-piece design for the handle cover is shown in FIG. 3.

As in a typical hot-air gun, a motor 8 rotates a fan 6 to achieve air flow through the hot-air gun. Power may be supplied to the motor 8 by line voltage or the like as is known in the art. For instance, the handle of the hot-air gun may be configured to receive a conventional electric power supply cord 12.

When power is supplied and the power-button 9 is pressed so that the power-switch 10 is activated to bring power to the motor 8 and the fan 6 so it rotates and to the heating element 1, air is drawn into the hot-air gun 20 through air inlets 24 (FIG. 1, where one air inlet 24 is shown; a second air inlet would behind the motor/fan, but cannot be seen in this view). Any number of alternate placements of air inlets are contemplated by the present invention. The air drawn into the hot-air gun 20 through air inlets 24 passes through a heating assembly 7.

Figure 5:
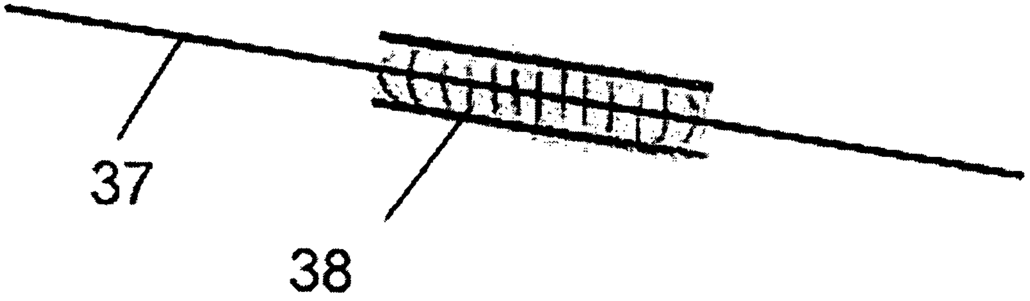
FIG. 5 is a side view of the resistance wire with a portion of the wire shown with the ceramic coating.

The heating element in the assembly 7 is preferably made by a ceramic covered 38 (FIG. 5) resistance wire 37 that is powered by the same energy source as the fan 6 and motor 8. The resistance wire 37 as is known in the art is made of a single metal, such as an alloy with proper resistance to give the desired effect of the hot-air gun. The ceramic cover 38 as is also known in the art is essentially baked on to the resistance wire to increase life expectancy of the wire. In FIG. 5, only a portion of wire 37 is shown coated to illustrate the wire 37 itself; however, the cover 38 is on the whole wire and the wire does not show in the invention. The vertical lines in FIG. 5 illustrate how the outer surface of the cover 38 might appear.

The heating assembly 7 warms the air as it passes over the heating element before it is expelled from the hot-air gun 20 through an outlet 26 in the end of the heating assembly 7. The heating assembly 7 is covered by a perforated metal tube 2 to reduce the outside temperature of the heated parts of the hot-air gun 20 and to provide safety.

Figure 2:
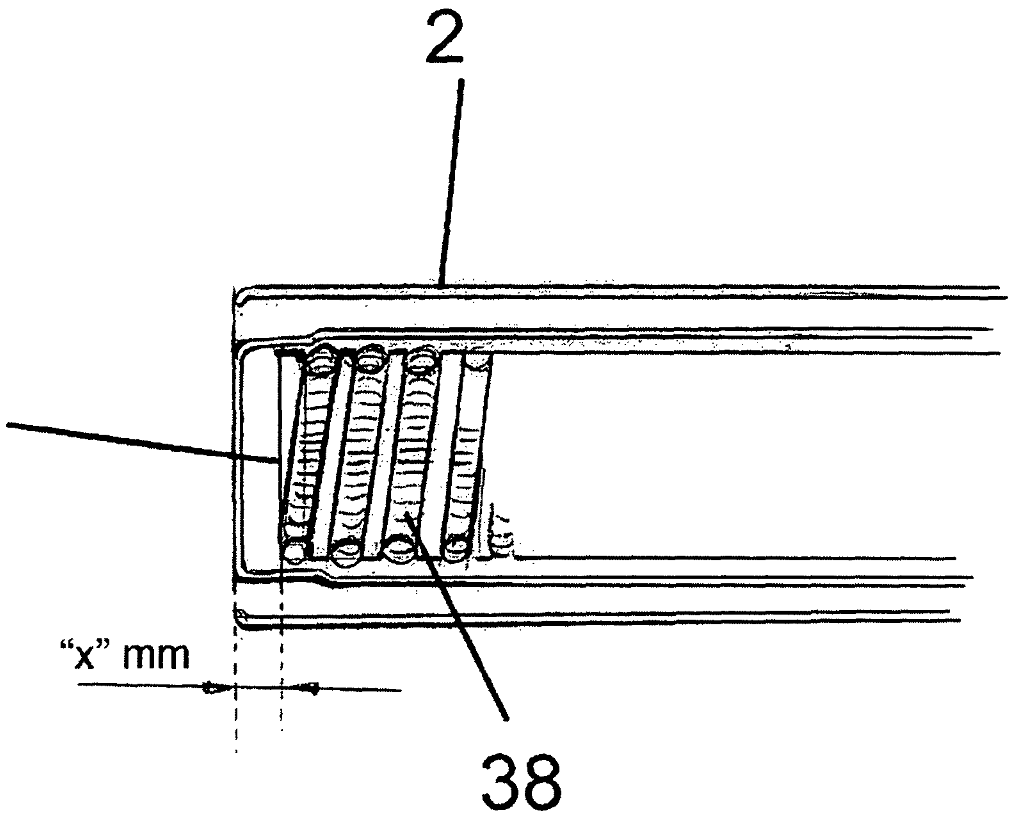
FIG. 2 is a cross-sectional view of the heating element position of the invention.

FIG. 2 illustrates a heating element 1 for use in a hot-air gun 20 in accordance with the present invention. In a preferred embodiment, the outside of the heating assembly 1 is protected and cooled by a perforated metal tube 2. The distance, distance "x" in FIG. 2, between the front of the tube 2 and the ceramic covered heating wire 38 of the heating assembly 1 is 1 to 25 mm but preferably 8 mm or below.

Figure 4:
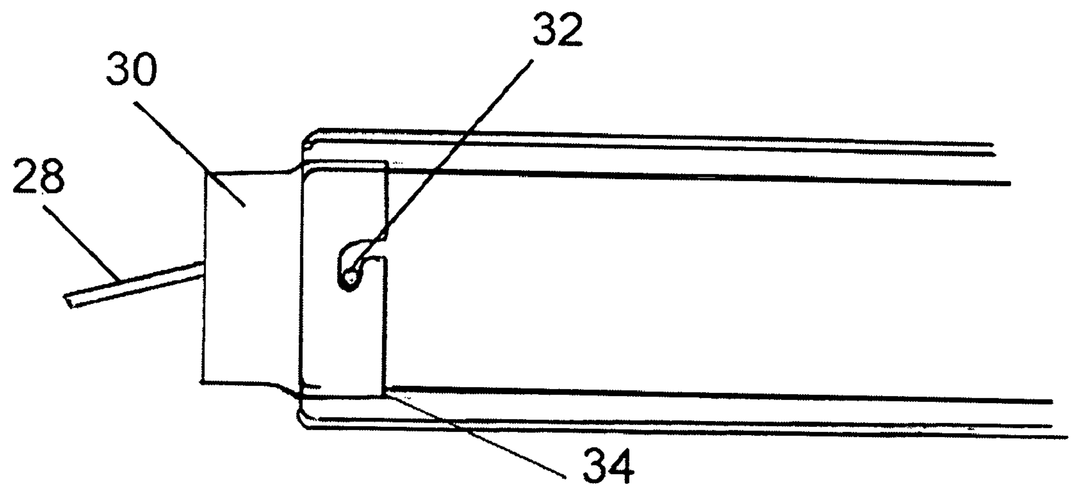
FIG. 4 is a side view of the grid scraper attached to the front portion of the invention herein, which is shown as a cross-section.

In one embodiment, shown in FIGS. 3-4, the hot-air gun has a scraper assembly 27 attached for scraping off old burnt in food on the grating of a grill. Scraper assembly 27 comprises a housing 30, having a round shape or what is needed to fit at the front of the hot-air gun (e.g., on heating assembly 7 in FIG. 1, so that scraper assembly 27 is inside outlet 26 when the device is assembled). It should be understood that various shapes and materials for both the scraper 28 and housing 30 may be employed and still be within the scope of the present invention. The first end 34 of the scraper housing 30, which attaches to the hot-air gun 20, is configured to be removably attached to the air outlet 26 of the hot-air gun 20. The first end 34 of the scraper housing 30 may have a diameter that is slightly smaller than the diameter of the air outlet of the hot-air gun 20, so that the first end 34 of the scraper housing 30 fits into the air outlet 26 of the barrel 36 of the hot-air gun 20. In another embodiment, the first end 34 of the scraper housing 30 may have a diameter that is slightly larger than the diameter of the air outlet of the hot-air gun so that the first end of the scraper housing may be positioned around the hot air outlet end of the barrel of the hot-air gun. In either of these embodiments, the scraper housing 30 may be held in place on the end of the barrel 36 of the hot-air gun 20 by a variety of means including but not limited to frictional engagement with the end of the hot-air gun or by a fastening mechanism 32 being a combination of corresponding slots and projections or ridges and grooves on the hot-air gun barrel and/or the first end of the scraper assembly, as is known in the art. The length of the scraper 28 may be varied depending on its specific design. The stand 5 for the hot-air gun can in one embodiment be designed as is FIG. 3.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention as described. The written description and drawings illustrate the present invention and are not to be construed as limited to the specific embodiments disclosed. Modifications to the disclosed embodiments, as well as other embodiments, are included within the scope of the invention.

What is claimed is:

1. A handheld electrical hot-air device comprising a high-effect ceramic-encapsulated wire heating element wherein the ceramic is baked on to the wire, and wherein the heating element is placed no farther than 8 mm from the air-outlet to give a high outlet temperature between 850-1100° C. so that solid fuels are ignited with fast ignition when the outlet of the device is placed at the surface of the fuel further comprising a removably attached scraper assembly.

2. The handheld electrical hot-air device of claim 1, wherein the distance between the front of the hot-air gun and the electrical heating wire is 8 mm or less.

3. The handheld electrical hot-air device of claim 1, further comprising a stand combined with a bottle opener attached to the device.

* * * * *